United States Patent
Wang et al.

(10) Patent No.: US 12,304,357 B2
(45) Date of Patent: May 20, 2025

(54) SYNCHRONOUS BRAKING CONTROL METHOD AND SYSTEM FOR CARRIAGES OF TRAIN

(71) Applicants: Yanping Wang, Liaoning (CN); Zhisen Wang, Liaoning (CN); Shixuan Cui, Liaoning (CN)

(72) Inventors: Yanping Wang, Liaoning (CN); Zhisen Wang, Liaoning (CN); Shixuan Cui, Liaoning (CN)

( * ) Notice: Subject to any disclaimer, the term of this patent is extended or adjusted under 35 U.S.C. 154(b) by 304 days.

(21) Appl. No.: 18/022,697

(22) PCT Filed: Nov. 19, 2021

(86) PCT No.: PCT/CN2021/131831
§ 371 (c)(1),
(2) Date: Feb. 22, 2023

(87) PCT Pub. No.: WO2022/142846
PCT Pub. Date: Jul. 7, 2022

(65) Prior Publication Data
US 2023/0311668 A1   Oct. 5, 2023

(30) Foreign Application Priority Data
Dec. 29, 2020 (CN) .......................... 202011589879.X (51) Int. Cl.
*B60L 7/26* (2006.01)
*B60L 7/28* (2006.01)
*B60T 8/17* (2006.01)

(52) U.S. Cl.
CPC .................... *B60L 7/26* (2013.01); *B60L 7/28* (2013.01); *B60T 8/1705* (2013.01); *B60L 2200/26* (2013.01); *B60L 2240/12* (2013.01)

(58) Field of Classification Search
CPC .......... B60L 7/26; B60L 7/28; B60L 2200/26; B60L 2240/12; B60T 8/1705
See application file for complete search history.

(56) References Cited

U.S. PATENT DOCUMENTS

| 5,118,055 A | 6/1992 | Veraart |
| 2014/0229058 A1* | 8/2014 | Herder .................. B60T 17/228 701/34.4 |

(Continued)

FOREIGN PATENT DOCUMENTS

| CN | 103944349 A | 7/2014 |
| CN | 105292092 A | 2/2016 |

(Continued)

OTHER PUBLICATIONS

Yin Chuanzhong et al., "Transportation", Shanghai Jiao Tong University Press, No. 951, Panyu Road, Shanghai, Sep. 2012.

*Primary Examiner* — Jacob M Amick
(74) *Attorney, Agent, or Firm* — Bridgeway IP Law Group, PLLC; Jihun Kim (57) ABSTRACT

Proposed are a synchronous braking control method and system for carriages of a train, that are related to the field of electrical control. The synchronous braking control system includes a main controller, an electric energy conversion controller, and a shunt. During actual braking, the main controller obtains a real-time speed and real-time mass of the train, and determines whether the real-time speed is greater than a set speed. If not, the train is directly braked in a mechanical friction braking mode. If yes, an exciting current of a synchronous brake in each of the carriages of the train is adjusted by adjusting an input voltage of the synchronous brake, and unit braking forces of the carriages are controlled equal by using the adjusted exciting current, thereby realizing synchronous constant deceleration braking of the carriages.

20 Claims, 2 Drawing Sheets

(56) References Cited

U.S. PATENT DOCUMENTS

2015/0130267 A1\* 5/2015 Rasel .................... B60T 13/665
                                                                 303/57
2023/0373457 A1\* 11/2023 Snyder ................. B60T 17/221

FOREIGN PATENT DOCUMENTS

| CN | 107323544 | A  | 11/2017 |
|----|-----------|----|---------|
| CN | 109774690 | A  | 5/2019  |
| CN | 110497798 | A  | 11/2019 |
| CN | 110562044 | A  | 12/2019 |
| CN | 110871692 | A  | 3/2020  |
| CN | 112644290 | A  | 4/2021  |
| WO | 2010108484 | A1 | 9/2010  |

\* cited by examiner

SYNCHRONOUS BRAKING CONTROL METHOD AND SYSTEM FOR CARRIAGES OF TRAIN

CROSS REFERENCE TO RELATED APPLICATION

This application claims priority to the Chinese Patent Application No. 202011589879.X, filed with the China National Intellectual Property Administration (CNIPA) on Dec. 29, 2020, and entitled "SYNCHRONOUS BRAKING CONTROL METHOD AND SYSTEM FOR CARRIAGES OF TRAIN", which is incorporated herein by reference in its entirety.

TECHNICAL FIELD

The present disclosure relates to the field of electrical control, and in particular, to a synchronous braking control method and system for carriages of a train.

BACKGROUND

At present, the braking mode commonly used by the G-series and D-series high-speed trains is combined braking, or called hybrid braking. The train consists of a motor car unit, which uses electrical braking (or called regenerative braking or feedback braking), and a trailer unit, which uses mechanical friction braking. Because it is difficult to ensure the unity of the braking force of electrical braking and mechanical friction braking in combined braking, there are different compression forces and impact forces between different carriages.

It is because of the difficult balance of compression forces and impact forces between different carriages that the train is prone to accidents during braking.

SUMMARY

In order to solve the above problems, the present disclosure provides a synchronous braking control method and system for carriages of a train. With a synchronous brake as a control object, the unit braking forces of the carriages in a motor car unit and a trailer unit of the train are equal through steps of detection, communication, transformation and braking, so as to minimize or even completely eliminate compression forces and impact forces between the carriages, thereby reducing a probability of train accidents.

To achieve the above objective, the present disclosure provides the following technical solutions:

A synchronous braking control method for carriages of a train includes the following steps:
  obtaining a real-time speed and real-time mass of the train; and
  determining whether the real-time speed is greater than a set speed,
  if not, braking the train in a mechanical friction braking mode until the train stops, and
  if yes, calculating an exciting current of a synchronous brake in each of the carriages of the train, and
  adjusting the exciting current injected into the synchronous brake to make unit braking forces of the carriages of the train equal, so as to realize synchronous braking of the carriages of the train until the real-time speed of the train is less than or equal to the set speed, and braking the train in the mechanical friction braking mode.

The present disclosure further introduces a synchronous braking control system for carriages of a train, implemented based on the synchronous braking control method for carriages of a train, and including:
  a main controller configured to obtain a real-time speed and real-time mass of the train and determine whether the real-time speed is greater than a set speed, and brake the train in a mechanical friction braking mode until the train stops if not, and calculate an exciting current of a synchronous brake in each of the carriages of the train if yes; and
  a shunt configured to inject the exciting current into the synchronous brake in each of the carriages of the train.

According to the specific embodiments provided by the present disclosure, the present disclosure provides the following technical effects:

1) By systematically controlling the synchronous brake in each of the carriages in the motor car unit and the trailer unit of the train, the unit braking force of the train is stable during braking, and the influence of compression force and impact force on the carriages is minimized, thus reducing the probability of train accidents caused by compression force or impact force.

2) By systematically controlling the double ring outer barrel compound synchronous eddy current brake in each of the carriages of the train, different braking modes are selected according to the braking source signal. The effective braking force of each of the carriages is calculated by detecting the real-time mass and real-time speed of each of the carriages. Further, the exciting current of each synchronous brake corresponding to the effective braking force in each of the carriages is calculated. According to a power supply system along the railway, the voltage provided to the synchronous brake in each of the carriages is adjusted, such that the braking force provided by the synchronous brake in each of the carriages can meet the requirements of effective braking force. The effective braking force of each of the carriages is further adjusted, so as to effectively weaken or eliminate compression forces and impact forces between the carriages, thereby reducing the probability of train accidents during braking.

3) On the basis of effectively reducing or eliminating effectively reduce or eliminate compression forces and impact forces of the carriages in the train through the synchronous braking control system and the synchronous braking control method, the train can also run at a high speed when the railway transportation expands the formation or heavy load, and the single passenger transport is expanded into the passenger and freight transport. Thus, the operation efficiency of the train line and the resource utilization rate of railway construction are greatly improved.

4) In addition to D-series and G-series high-speed trains, the synchronous braking control method and synchronous braking control system provided by the present disclosure can also be applied to other transportation modes such as heavy-duty freight trains, heavy-duty freight trucks, and ships, so as to realize synchronous braking and effectively improve transportation safety.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

REFERENCE NUMERALS

1—main controller, 2—electric energy conversion controller, 3—shunt, and 4—synchronous brake; and G represents a fault alarm signal, J represents an emergency braking signal, T represents an inbound braking signal, Z represents a normal speed regulating signal, V represents a real-time speed of the train, $m_1$-$m_n$ represent real-time masses of the carriages of the train, $I_{f1}$-$I_{fn}$ represent exciting currents injected into multiple synchronous brakes, and $D_{11}$-$D_{n8}$ represent the synchronous brakes in all of the carriages.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

At present, the combined braking mode is used on the G-series and D-series high-speed trains. The motor car unit of the train uses the electrical braking in the combined braking mode, and the trailer unit of the train uses the mechanical friction braking in the combined braking mode. During braking of the train, it is difficult to ensure that the electrical braking of the motor car unit and the mechanical friction braking of the trailer unit are synchronized, which easily leads to certain compression and impact forces between different carriages of the train.

The compression force is generated because the braking medium of electrical braking is the electromagnetic wave, and the braking medium of mechanical friction braking is air. Because the transmission speed of air is different from that of the electromagnetic wave, the electrical braking and the mechanical friction braking are not synchronized in the process of inflation and deflation during braking, which is easy to generate a certain compression force in the middle of the train.

The impact force is generated because when the train is running at a high speed, the motor car unit and the trailer unit of the train are in a tensile state, that is, the couplers of the adjacent carriages have a tensile force in the opposite direction. The motor car unit is the driving part of the train and has a driving force, while the trailer unit is the carrying part of the train and does not have a driving force. As a result, when the train running at high speed is suddenly braked, the motor car unit decelerates gradually under the driving force, while the trailer unit continues to run at the original speed and decelerates by mechanical friction braking. During deceleration, the tensile force in opposite direction of the couplers between the adjacent carriages of the train changes into the impact force in opposite direction, and the impact forces between the couplers at different positions of the train are not equal.

More specifically, the variable frequency feedback braking method is generally adopted for the braking of the motor car unit, but this braking method can only realize braking to a medium speed, that is, 50 km/h. The trailer unit adopts disc friction braking. During actual braking, the motor car unit can realize synchronous braking, but synchronous braking cannot be realized between the motor car unit and the trailer unit and between the trailer unit and the trailer unit. Especially when there are one motor car unit and multiple trailer units, it is more difficult to realize synchronous braking between the trailer units.

Because it is difficult to realize synchronous braking between the motor car unit and the trailer unit and between the trailer unit and the trailer unit, there are compression forces and impact forces between different carriages of the train. The compression force and impact force are expressed as follows by formulas:

$$R = \frac{5}{12}(K \cdot \varphi_k)_{max} \cdot \frac{l \cdot n^2}{t_{ZC} \cdot \omega_{ZB}},$$

and $$R_{Amax} = \frac{1}{4}(K \cdot \varphi_k) \cdot n,$$

where R represents a total compression force of the train, K represents a total brake shoe pressure of each of the carriages of the train, in tons, $(K \cdot \varphi_k)$ represents an effective braking force of each of the carriages of the train, $(K \cdot \varphi_k)_{max}$ represents a maximum effective braking force of each of the carriages of the train, l represents a length of one carriage of the train, n represents a total number of train formations, $t_{ZC}$ represents an inflation time of a brake cylinder of the train, $\omega_{ZB}$ represents a transmission speed of a brake wave in a tubing, and $R_{A\ max}$ represents a longitudinal impact force of the train during braking in a tensile state.

The compression force and impact force during train braking are exactly the inducement of train accidents. Moreover, the existence of compression force and impact force have a great impact on the train formation and running speed, affecting its economic benefits.

Therefore, it is very important for the development of railway transportation to weaken or even eliminate the compression force and impact force caused by combined braking in the prior art, so as to reduce the probability of accidents during train braking.

In order to solve the above problems, the present disclosure provides a synchronous braking control method for carriages of a train and a synchronous braking control system for carriages of a train.

Based on the principle of equal unit braking forces, the exciting current required by the synchronous brake in each of the carriages of the train to realize synchronous braking is calculated according to the obtained real-time speed and real-time mass of the train. By adjusting the exciting current injected into the synchronous brake in each of the carriages of the train in real time, synchronous constant deceleration braking of the carriages of the train is realized.

To make the above objectives, features, and advantages of the present disclosure clearer and more comprehensible, the present disclosure will be further described in detail below with reference to the accompanying drawings and specific implementations.

Embodiment 1

Figure 1:
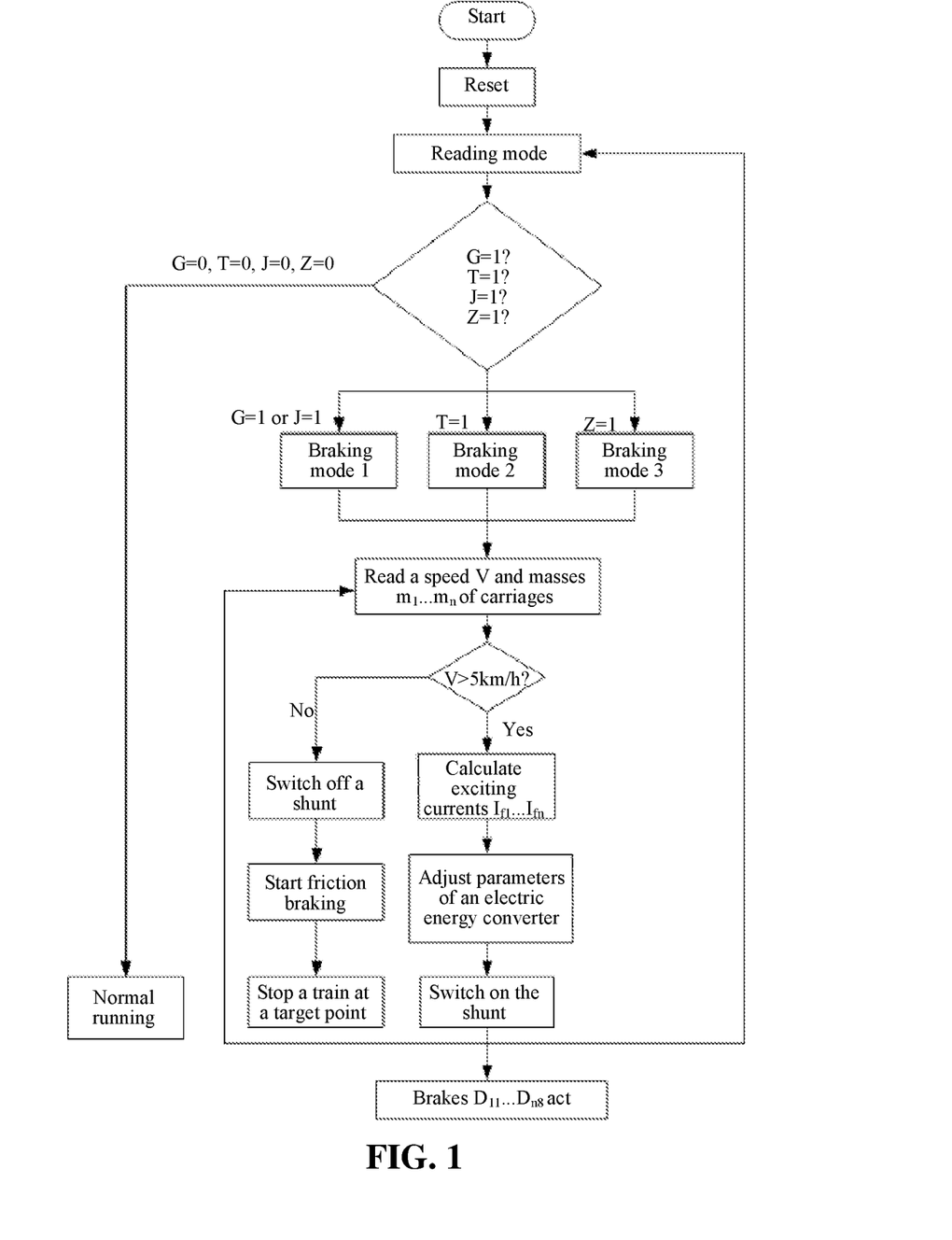
FIG. 1 is a flow chart of a synchronous braking control method for carriages of a train in Embodiment 1 of the present disclosure.

FIG. 1 is a flow chart of a synchronous braking control method for carriages of a train in Embodiment 1 of the present disclosure.

It can be seen from the figure that the synchronous braking control method provided in the present disclosure includes the following processes.

A real-time speed and a real-time mass of the train are obtained, and whether the real-time speed is greater than a set speed is determined.

If not, the train is braked in a mechanical friction braking mode until the train stops.

If yes, an exciting current of a synchronous brake in each of the carriages of the train is calculated.

After the exciting current required by each of the carriages of the train to realize synchronous braking is calculated, it is necessary to inject the exciting current into the synchronous brake in each of the carriages of the train. By adjusting the exciting current injected into the synchronous brake in each of the carriages of the train in real time, the unit braking forces of the carriages of the train are equal, so as to realize the synchronous braking of the carriages of the train until the real-time speed of the train is less than or equal to the set speed, and the train is braked in the mechanical friction braking mode until the train stops.

Next, the specific process of each step of the synchronous braking control method for carriages of a train in Embodiment 1 of the present disclosure will be described in detail.

When the real-time speed of the train is greater than the set speed, the exciting current of the synchronous brake in each of the carriages of the train needs to be calculated. A process of calculating the exciting current includes the following sub-steps.

A braking control signal is obtained.

A corresponding braking mode is selected according to the braking control signal.

A corresponding unit braking force is selected according to the braking mode.

The exciting current of the synchronous brake in each of the carriages of the train is calculated according to the unit braking force.

The braking control signal includes a fault alarm signal, an emergency braking signal, an inbound braking signal, and a normal speed regulating signal.

The braking mode includes a first braking mode, a second braking mode, and a third braking mode.

Both the fault alarm signal and the emergency braking signal correspond to the first braking mode. The inbound braking signal corresponds to the second braking mode. The normal speed regulating signal corresponds to the third braking mode.

The train encounters a variety of conditions during running.

If the train runs safely from the departure station to the terminus without encountering natural disasters or mechanical failures, the third braking mode corresponding to the normal speed regulating signal can be selected during running, and the second braking mode corresponding to the inbound braking signal can be selected before the train reaches the terminus.

However, if the train encounters natural disasters or mechanical failures during running or when it is about to arrive at the station, the first braking mode corresponding to the fault alarm signal or emergency braking signal can be selected to realize the braking stop of the train in the shortest time and the shortest distance as far as possible, so as to avoid major train accidents.

Therefore, when the real-time speed of the train is greater than the set speed, the above braking mode selection of the present disclosure can enable the train to quickly deal with various problems encountered during running or braking, and improve the safety of the train during running or braking.

In addition, if the first braking mode corresponding to the fault alarm signal or emergency braking signal is selected, the train is braked with a maximum braking force of the synchronous brake in each of the carriages due to emergency.

If the third braking mode corresponding to the normal speed regulating signal or the second braking mode corresponding to the inbound braking signal is selected, real-time acceleration of the train is calculated according to a braking distance of the train and the real-time speed of the train, and the train is braked with a unit braking force corresponding to the real-time acceleration.

After the corresponding unit braking force during train running or braking is selected, it is necessary to calculate the exciting current required for synchronous braking of the carriages of the train according to the unit braking force.

This process specifically includes: calculating a synthetic magnetic flux of the synchronous brake in each of the carriages of the train according to the unit braking force, and calculating the exciting current of the synchronous brake in each of the carriages of the train according to the synthetic magnetic flux of the synchronous brake in each of the carriages of the train.

More specifically, it can be known from Newton's second law formula $F_n = m_n a_n$ and a calculation formula of a total braking torque $M_n = F_n R_n = C_{M_n} \phi_n I_n$ that the unit braking force has the following relationship with the synthetic magnetic flux:

$$F_n = m_n a_n = \frac{C_{M_n} \phi_n I_n}{R_n},$$

where n represents a number of the carriages of the train, $F_n$ represents the unit braking force of each of the carriages of the train, $m_n$ represents a real-time mass of each of the carriages of the train, $a_n$ represents real-time acceleration of each of the carriages of the train, $M_n$ represents a total braking torque of each of the carriages of the train, $R_n$ represents a braking radius of each of the carriages of the train, $C_{M_n}$ represents a torque constant of each of the carriages of the train, $\phi_n$ represents the synthetic magnetic flux of each of the carriages of the train, and $I_n$ represents a total armature current of each of the carriages of the train.

The synthetic magnetic flux has the following relationship with the exciting current:

$$I_{f_n} = \frac{\phi_n R_n}{N_n},$$

where $I_{f_n}$ represents the exciting current of the synchronous brake in each of the carriages of the train, $\phi_n$ represents the synthetic magnetic flux of each of the carriages of the train, $R_n$ represents magnetic reluctance of the synchronous brake in each of the carriages of the train, and $N_n$ represents a number of turns of coil of the synchronous brake in each of the carriages of the train.

Through the above processes, the exciting current required for synchronous braking of the carriages of the train can be calculated, and the exciting current needs to be injected into the synchronous brake in each of the carriages of the train.

Here is a problem as follows.

The power supply systems along the railway in different regions are different: some regions use a single-phase alternating current (AC) voltage, some regions use a three-phase AC voltage, and some regions use a direct current (DC) voltage. The synchronous brake in the present disclosure is powered by the DC voltage. Therefore, it is necessary to transform the power supply systems along the railway in different regions to provide a normal working voltage for the synchronous brake in the present disclosure.

Specifically, a method for adjusting an input voltage of the synchronous brake in each of the carriages of the train is as follows.

The input voltage of the synchronous brake in each of the carriages of the train is adjusted by adjusting a duty ratio and a triggering delay angle of a switching power supply.

The adjustment is performed in the following three modes.

(1) When the power supply system along the railway is a single-phase AC voltage, $U_d=0.9U_2 \cos \alpha$.

(2) When the power supply system along the railway is a three-phase AC voltage, $U_d=2.34U_2 \cos \alpha$.

(3) When the power supply system along the railway is a DC voltage, $$U_d = \frac{DU_2}{1-D}.$$

$U_d$ represents the input voltage of the synchronous brake, $U_2$ represents a voltage of a power supply along the railway, $\alpha$ represents the triggering delay angle, and D represents the duty ratio of the switching power supply.

In addition, the input voltage of the synchronous brake has the following relationship with the exciting current of the synchronous brake:

$$I_{f_n} = \frac{U_d}{Z_n},$$

where $I_{f_n}$ represents the exciting current of the synchronous brake in each of the carriages of the train, and $Z_n$ represents reactance of the synchronous brake in each of the carriages of the train.

Through the above three voltage adjustment modes and the relationship between the input voltage of synchronous brake and the exciting current of synchronous brake, it can be seen that in order to realize synchronous braking of the carriages of the train, the corresponding exciting current $I_{f_n}$ needs to be injected into the synchronous brake of each car. The premise of injecting the exciting current $I_{f_n}$ is to obtain the corresponding input voltage $U_d$ of the synchronous brake. The input voltage $U_d$ of the synchronous brake is adjusted from the power supply system along the railway in various regions by adjusting the duty ratio and the triggering delay angle of the switching power supply.

Therefore, the above processes of the present disclosure can directly convert the power supply system along the railway in various regions into the input voltage system suitable for the synchronous brake for synchronous braking in the present disclosure, and realize the synchronous braking of the carriages of the train.

In addition to the above, the present disclosure further introduces a synchronous braking control system realizing synchronous braking of carriages of a train based on the above synchronous braking control method in Embodiment 2.

Embodiment 2

Figure 2:
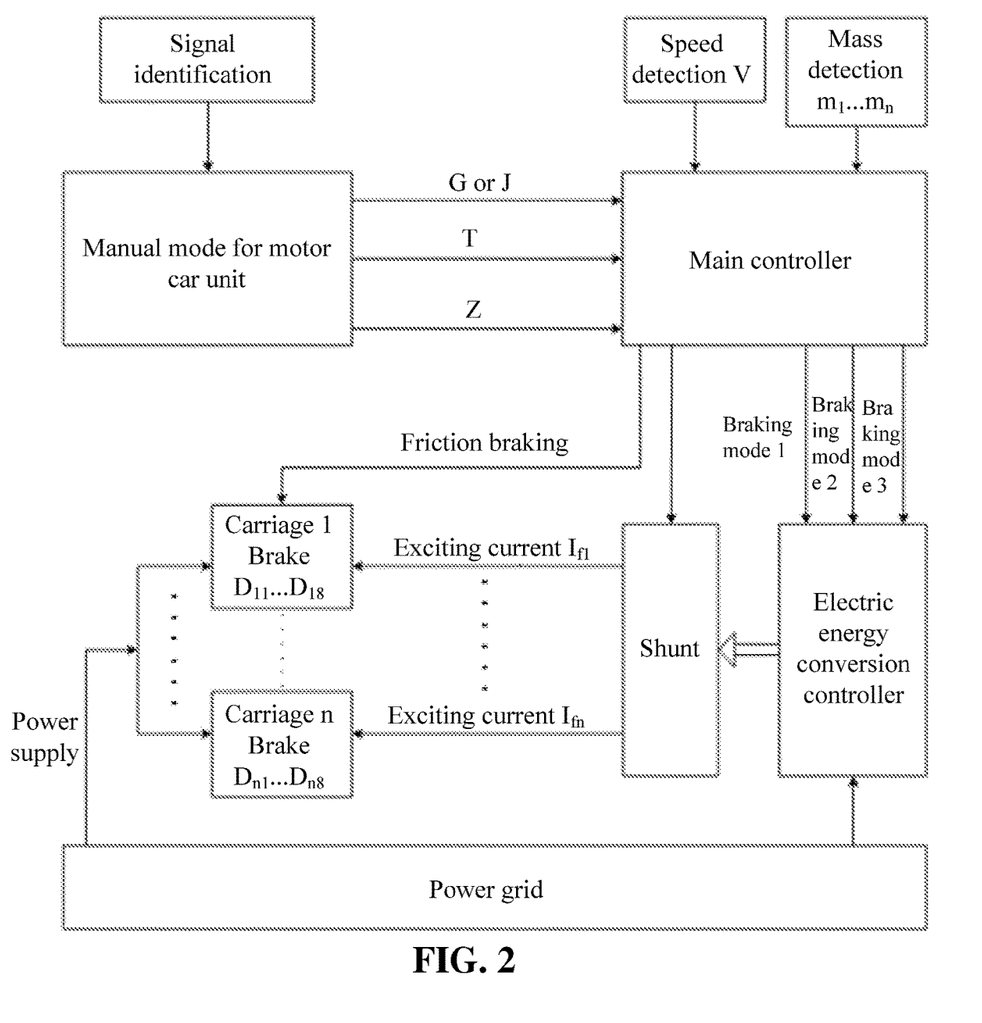
FIG. 2 is a schematic structural diagram of a synchronous braking control system for carriages of a train in Embodiment 2 of the present disclosure.

FIG. 2 is a schematic structural diagram of a synchronous braking control system for carriages of a train in Embodiment 2 of the present disclosure.

It can be seen that the synchronous braking control system includes a main controller 1, an electric energy conversion controller 2, a shunt 3 and multiple synchronous brakes 4.

The main controller 1 is configured to obtain a real-time speed and real-time mass of the train and determine whether the real-time speed is greater than a set speed.

The main controller is further configured to brake the train in a mechanical friction braking mode until the train stops if the real-time speed is not greater than the set speed, and calculate an exciting current of a synchronous brake 4 in each of the carriages of the train if the real-time speed is greater than the set speed.

The shunt 3 is configured to inject the exciting current into the synchronous brake 4 in each of the carriages of the train. Synchronous braking of the carriages of the train is realized after the exciting current is injected into the synchronous brake 4.

When the power supply system along the railway in the region using the synchronous braking control system of the carriages of the train is the same as the power supply system of the synchronous brake 4 in each of the carriages of the train, the synchronous braking of the carriages of the train can be realized directly by the main controller 1 and the shunt 3.

However, when the power supply system along the railway in the region using the synchronous braking control system of the carriages of the train is different from the power supply system of the synchronous brake 4 in each of the carriages of the train, an electric energy conversion controller 2 needs to be added to the system.

The electric energy conversion controller 2 is configured to adjust an input voltage of the synchronous brake 4 in each of the carriages of the train according to a power supply system along a railway, so as to inject the exciting current required for synchronous braking into the synchronous brake 4 in each of the carriages of the train.

The above synchronous braking control system provided in the present disclosure is implemented based on the synchronous braking control method provided in Embodiment 1, which can also effectively weaken or even eliminate the compression forces and impact forces of the carriages of the train and realize the synchronous braking of the carriages of the train, so as to improve the safety performance of the train during running and braking.

More specifically, the synchronous braking control method and the synchronous braking control system provided in the present disclosure can be used to control the double ring outer barrel compound synchronous eddy current brake in each of the carriages of the train.

The synchronous braking control method in Embodiment 1 is used to make the unit braking forces of double ring outer barrel compound synchronous eddy current brakes in the carriages of the train equal, so as to automatically eliminate the hidden dangers and idling braking during train braking, and eliminate the compression force and impact force that cannot be eliminated by the existing combined braking method. Therefore, the running and braking safety of the train is improved, and safety conditions are also provided for expanding the train formation and other formation combinations.

Specific examples are used herein to explain the principles and implementations of the present disclosure. The foregoing description of the embodiments is merely intended to help understand the method of the present disclosure and its core ideas; besides, various modifications may be made by those of ordinary skill in the art to specific implementations and the scope of application in accordance with the ideas of the present disclosure. In conclusion, the content of the present specification shall not be construed as limitations to the present disclosure.

What is claimed is:

1. A synchronous braking control method for carriages of a train, comprising the following steps:
   obtaining a real-time speed and real-time mass of the train; and
   determining whether the real-time speed is greater than a set speed,
   if not, braking the train in a mechanical friction braking mode until the train stops, and
   if yes, calculating an exciting current of a synchronous brake in each of the carriages of the train, and
   adjusting the exciting current injected into the synchronous brake to make unit braking forces of the carriages of the train equal, returning to the step of "obtaining a real-time speed of the train" until the real-time speed of the train is less than or equal to the set speed, and braking the train in the mechanical friction braking mode.

2. The synchronous braking control method for carriages of a train according to claim 1, wherein a process of calculating an exciting current of a synchronous brake in each of the carriages of the train specifically comprises:
   obtaining a braking control signal;
   selecting a corresponding braking mode according to the braking control signal;
   selecting a corresponding unit braking force according to the braking mode; and
   calculating the exciting current of the synchronous brake in each of the carriages of the train according to the unit braking force.

3. The synchronous braking control method for carriages of a train according to claim 2, wherein
   the braking control signal comprises:
   a fault alarm signal, an emergency braking signal, an inbound braking signal, and a normal speed regulating signal;
   the braking mode comprises:
   a first braking mode, a second braking mode, and a third braking mode;
   both the fault alarm signal and the emergency braking signal correspond to the first braking mode;
   the inbound braking signal corresponds to the second braking mode;
   the normal speed regulating signal corresponds to the third braking mode; and
   a process of selecting a corresponding unit braking force according to the braking mode specifically comprises:
   when the braking mode is the first braking mode, braking with a maximum braking force of the synchronous brake; and
   when the braking mode is the second braking mode or the third braking mode, calculating real-time acceleration of the train according to a braking distance of the train and the real-time speed of the train, and braking with a unit braking force corresponding to the real-time acceleration.

4. The synchronous braking control method for carriages of a train according to claim 2, wherein a process of calculating the exciting current of the synchronous brake in each of the carriages of the train according to the unit braking force specifically comprises:
   calculating a synthetic magnetic flux of the synchronous brake in each of the carriages of the train according to the unit braking force; and
   calculating the exciting current of the synchronous brake in each of the carriages of the train according to the synthetic magnetic flux of the synchronous brake in each of the carriages of the train, wherein
   the unit braking force has the following relationship with the synthetic magnetic flux:

$$F_n = m_n a_n = \frac{C_{M_n} \phi_n I_n}{R_n},$$

wherein n represents a number of the carriages of the train, $F_n$ represents the unit braking force of each of the carriages of the train, $m_n$ represents a real-time mass of each of the m carriages of the train, $a_n$ represents real-time acceleration of each of the carriages of the train, $M_n$ represents a total braking torque of each of the carriages of the train, $R_n$ represents a braking radius of each of the carriages of the train, $C_{M_n}$ represents a torque constant of each of the carriages of the train, $\phi_n$ represents the synthetic magnetic flux of each of the carriages of the train, and $I_n$ represents a total armature current of each of the carriages of the train.

5. The synchronous braking control method for carriages of a train according to claim 4, wherein the synthetic magnetic flux has the following relationship with the exciting current:

$$I_{f_n} = \frac{\phi_n R_n}{N_n},$$

wherein $I_{f_n}$ represents the exciting current of the synchronous brake in each of the carriages of the train, $\phi_n$ represents the synthetic magnetic flux of each of the carriages of the train, $R_n$ represents magnetic reluctance of the synchronous brake in each of the carriages of the train, and $N_n$ represents a number of turns of coil of the synchronous brake in each of the carriages of the train.

6. The synchronous braking control method for carriages of a train according to claim 1, wherein a process of adjusting the exciting current injected into the synchronous brake specifically comprises:
   adjusting an input voltage of the synchronous brake in each of the carriages of the train according to a power supply system along a railway; and injecting the exciting current into the synchronous brake according to the input voltage of the synchronous brake;
a process of adjusting an input voltage of the synchronous brake in each of the carriages of the train according to a power supply system along a railway specifically comprises:
adjusting the input voltage of the synchronous brake in each of the carriages of the train according to the power supply system along the railway by adjusting a duty ratio and a triggering delay angle of a switching power supply; and
adjustment modes comprise:
when the power supply system along the railway is a single-phase alternating current (AC) voltage, $U_d=0.9U_2 \cos \alpha$,
when the power supply system along the railway is a three-phase AC voltage, $U_d=2.34U_2 \cos \alpha$; and
when the power supply system along the railway is a direct current (DC) voltage, $$U_d = \frac{DU_2}{1-D},$$

wherein $U_d$ represents the input voltage of the synchronous brake, $U_2$ represents a voltage of a power supply along the railway, a represents the triggering delay angle, and D represents the duty ratio of the switching power supply.

7. The synchronous braking control method for carriages of a train according to claim 6, wherein in a process of injecting the exciting current into the synchronous brake according to the input voltage of the synchronous brake:
the input voltage of the synchronous brake has the following relationship with the exciting current of the synchronous brake:

$$I_{f_n} = \frac{U_d}{Z_n},$$

wherein $I_{f_n}$ represents the exciting current of the synchronous brake in each of the carriages of the train, and $Z_n$ represents reactance of the synchronous brake in each of the carriages of the train.

8. A synchronous braking control system for carriages of a train, implemented based on the synchronous braking control method for carriages of a train according to claim 1, and comprising:
a main controller configured to obtain a real-time speed and real-time mass of the train and determine whether the real-time speed is greater than a set speed, and brake the train in a mechanical friction braking mode until the train stops if not, and calculate an exciting current of a synchronous brake in each of the carriages of the train if yes;
a shunt configured to inject the exciting current into the synchronous brake in each of the carriages of the train, wherein synchronous braking of the carriages of the train is realized after the exciting current is injected into the synchronous brake; and
an electric energy conversion controller configured to adjust an input voltage of the synchronous brake in each of the carriages of the train according to a power supply system along a railway, so as to inject the exciting current into the synchronous brake in each of the carriages of the train.

9. The synchronous braking control system for carriages of a train according to claim 8, wherein a process of calculating an exciting current of a synchronous brake in each of the carriages of the train specifically comprises:
obtaining a braking control signal;
selecting a corresponding braking mode according to the braking control signal;
selecting a corresponding unit braking force according to the braking mode; and
calculating the exciting current of the synchronous brake in each of the carriages of the train according to the unit braking force.

10. The synchronous braking control system for carriages of a train according to claim 9, wherein
the braking control signal comprises:
a fault alarm signal, an emergency braking signal, an inbound braking signal, and a normal speed regulating signal;
the braking mode comprises:
a first braking mode, a second braking mode, and a third braking mode;
both the fault alarm signal and the emergency braking signal correspond to the first braking mode;
the inbound braking signal corresponds to the second braking mode;
the normal speed regulating signal corresponds to the third braking mode; and
a process of selecting a corresponding unit braking force according to the braking mode specifically comprises:
when the braking mode is the first braking mode, braking with a maximum braking force of the synchronous brake; and
when the braking mode is the second braking mode or the third braking mode, calculating real-time acceleration of the train according to a braking distance of the train and the real-time speed of the train, and braking with a unit braking force corresponding to the real-time acceleration.

11. The synchronous braking control system for carriages of a train according to claim 9, wherein a process of calculating the exciting current of the synchronous brake in each of the carriages of the train according to the unit braking force specifically comprises:
calculating a synthetic magnetic flux of the synchronous brake in each of the carriages of the train according to the unit braking force; and
calculating the exciting current of the synchronous brake in each of the carriages of the train according to the synthetic magnetic flux of the synchronous brake in each of the carriages of the train, wherein
the unit braking force has the following relationship with the synthetic magnetic flux:

$$F_n = m_n a_n = \frac{C_{M_n} \phi_n I_n}{R_n},$$

wherein n represents a number of the carriages of the train, $F_n$ represents the unit braking force of each of the carriages of the train, $m_n$ represents a real-time mass of each of the carriages of the train, $a_n$ represents real-time acceleration of each of the carriages of the train, $M_n$ represents a total braking torque of each of the carriages of the train, $R_n$ represents a braking radius of each of the carriages of the train, $C_{M_n}$ represents a torque constant of each of the carriages of the train, $\phi_n$ represents the synthetic magnetic flux of each of the carriages of the train, and $I_n$ represents a total armature current of each of the carriages of the train.

12. The synchronous braking control system for carriages of a train according to claim 11, wherein the synthetic magnetic flux has the following relationship with the exciting current:

$$I_{f_n} = \frac{\phi_n R_n}{N_n},$$

wherein $I_{f_n}$ represents the exciting current of the synchronous brake in each of the carriages of the train, $\phi_n$ represents the synthetic magnetic flux of each of the carriages of the train, $R_n$ represents magnetic reluctance of the synchronous brake in each of the carriages of the train, and $N_n$ represents a number of turns of coil of the synchronous brake in each of the carriages of the train.

13. The synchronous braking control system for carriages of a train according to claim 8, wherein a process of adjusting the exciting current injected into the synchronous brake specifically comprises:
   adjusting an input voltage of the synchronous brake in each of the carriages of the train according to a power supply system along a railway; and injecting the exciting current into the synchronous brake according to the input voltage of the synchronous brake;
   a process of adjusting an input voltage of the synchronous brake in each of the carriages of the train according to a power supply system along a railway specifically comprises:
   adjusting the input voltage of the synchronous brake in each of the carriages of the train according to the power supply system along the railway by adjusting a duty ratio and a triggering delay angle of a switching power supply; and
   adjustment modes comprise:
   when the power supply system along the railway is a single-phase alternating current (AC) voltage, $U_d = 0.9 U_2 \cos \alpha$,
   when the power supply system along the railway is a three-phase AC voltage, $U_d = 2.34 U_2 \cos \alpha$; and
   when the power supply system along the railway is a direct current (DC) voltage, $$U_d = \frac{D U_2}{1 - D},$$

wherein $U_d$ represents the input voltage of the synchronous brake, $U_2$ represents a U voltage of a power supply along the railway, a represents the triggering delay angle, and D represents the duty ratio of the switching power supply.

14. The synchronous braking control system for carriages of a train according to claim 13, wherein in a process of injecting the exciting current into the synchronous brake according to the input voltage of the synchronous brake:
   the input voltage of the synchronous brake has the following relationship with the exciting current of the synchronous brake:

$$I_{f_n} = \frac{U_d}{Z_n},$$

wherein $I_{f_n}$ represents the exciting current of the synchronous brake in each of the carriages of the train, and $Z_n$ represents reactance of the synchronous brake in each of the carriages of the train.

15. The synchronous braking control system for carriages of a train according to claim 8, wherein the synchronous brake is a double ring outer barrel compound synchronous eddy current brake.

16. The synchronous braking control system for carriages of a train according to claim 9, wherein the synchronous brake is a double ring outer barrel compound synchronous eddy current brake.

17. The synchronous braking control system for carriages of a train according to claim 10, wherein the synchronous brake is a double ring outer barrel compound synchronous eddy current brake.

18. The synchronous braking control system for carriages of a train according to claim 11, wherein the synchronous brake is a double ring outer barrel compound synchronous eddy current brake.

19. The synchronous braking control system for carriages of a train according to claim 12, wherein the synchronous brake is a double ring outer barrel compound synchronous eddy current brake.

20. The synchronous braking control system for carriages of a train according to claim 13, wherein the synchronous brake is a double ring outer barrel compound synchronous eddy current brake.

* * * * *